May 1, 1962     S. WEAVER     3,032,766

VEHICLE SPEED RECORDING APPARATUS

Filed Jan. 28, 1960

INVENTOR.
SCOTT WEAVER
BY
*W. B. Harpman*
ATTORNEY

United States Patent Office 3,032,766
Patented May 1, 1962

3,032,766
VEHICLE SPEED RECORDING APPARATUS
Scott Weaver, Guide Building, Canfield, Ohio
Filed Jan. 28, 1960, Ser. No. 5,249
5 Claims. (Cl. 346—107)

This invention relates to a device that may be positioned in an automobile and used to photograph the speed as indicated by an instrument in the automobile simultaneously with a vehicle in front of the equipped automobile.

The principal object of the invention is a provision of a simple readily-installed and easily used vehicle speed recording apparatus.

A further object of the invention is the provision of a vehicle speed recording apparatus which does not obstruct the vision of the driver of the equipped vehicle.

A further object of the invention is the provision of a vehicle speed recording apparatus that uses a single frame sequence camera together with a separate lens for focusing the camera on the speed recording instrument of the vehicle.

A further object of the invention is the provision of a vehicle speed recording apparatus that results in relatively large prints from photographic negatives taken by the device and which prints clearly illustrate the speed recording instrument and time as well as the field of view in front of the vehicle.

The vehicle speed recording apparatus disclosed herein comprises an improvement in the art in that the apparatus provides a simple and efficient means of equipping an automobile so that it can be used in recording the speed of another vehicle. It has been heretofore proposed to use a movie camera mounted in a vehicle and incorporating special lenses by means of which an integral speed recording instrument positioned within the camera housing or immediately adjacent thereto may be utilized. Such devices are expensive, require careful installation and operation and are limited to the photographic ability of the movie camera employed. The present invention uses a conventional 35 mm. single frame sequence camera which possesses a number of advantages photographically as compared with the movie camera and which camera is relatively small and capable of being mounted on a carrier which is simply strapped down in the vehicle so equipped. A speed recording device such as a speedometer and a clock are also mounted on the carrier and intermediate the camera and the speed recording device a lens is mounted so that a small portion of the field of view of the camera encompasses the lens which acts to correct the focus of the camera on the speed recording device and clock. The majority of the field of view of the camera remains as set thereon so that it is focused at a point in front of the equipped vehicle as for example as necessary when a vehicle such as a moving truck having identifying signs and a license number is to be photographed. The vehicle speed recording apparatus disclosed herein thus makes possible the use of almost any vehicle as a patrol car as the apparatus is extremely compact, light weight and efficient and may be positioned in any vehicle in a very short time.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein.

Figure 2:
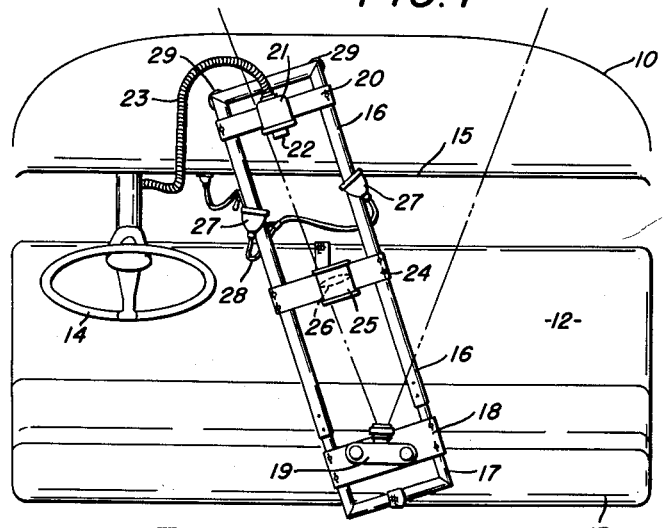
FIGURE 2 is a top plan view of a portion of a vehicle showing the speed recording apparatus positioned therein.
Figure 3:
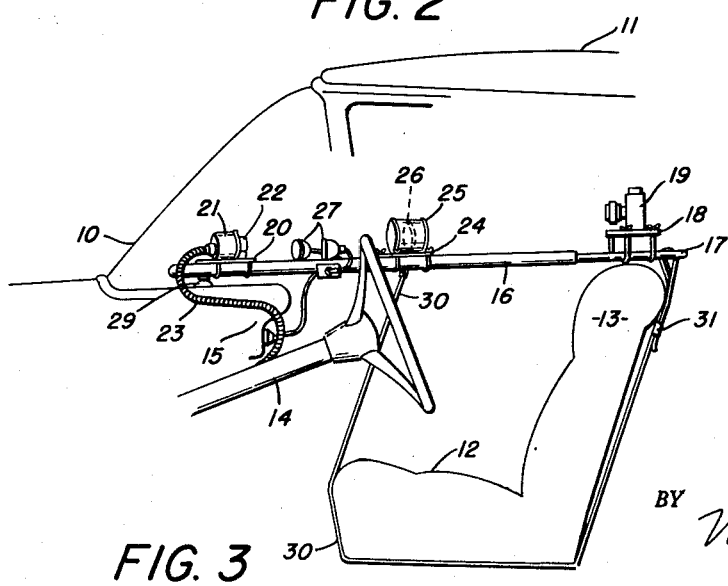
FIGURE 3 is a side elevation of a portion of a vehicle showing the speed recording apparatus positioned therein.

By referring to the drawings and FIGURES 2 and 3, it will be seen that a vehicle speed recording apparatus is shown positioned in a vehicle such as a passenger automobile, portions of which are illustrated as follows: the windshield 10, the top 11, the front seat 12, the back 13 of the front seat, the steering wheel 14 and the instrument panel 15. In the vehicle, as partially illustrated in FIGURES 2 and 3, the vehicle speed recording apparatus appears as a rectangular carrier frame 16 preferably tubular and having an end 17 thereof telescopically arranged with respect to the remainder. A first platform 18 is detachably and adjustably mounted on the carrier frame 16 and in turn supports a camera 19 which is preferably of the 35 mm. single frame sequence type. The opposite end of the carrier frame 16 has a second transverse platform 20 adjustably secured thereto which in turn supports a speed recording instrument such as a speedometer 21 which preferably has a clock 22 formed as a part thereof or positioned directly in front of the dial thereof. Space is also provided on the speed recording instrument 21 so that a calendar date notation may be affixed thereto. A flexible drive shaft 23 extends from the speedometer 21 to an appropriate location in the equipped automobile such as the connection between the factory installed speedometer and its driving means which is readily accessible beneath the instrument panel 15 as will occur to those skilled in the art. In operation, the flexible drive shaft 23 is connected so that the speedometer 21 is operative.

A third platform 24 is adjustably positioned on the carrier frame 16 intermediate the ends thereof and in turn carries a lens mounting 25 which holds a lens 26. It will thus be seen by referring to FIGURE 2 in particular that the field of view of the camera 19, which is shown by broken lines in FIGURE 2, includes the lens 26 in one side portion thereof.

Figure 1:
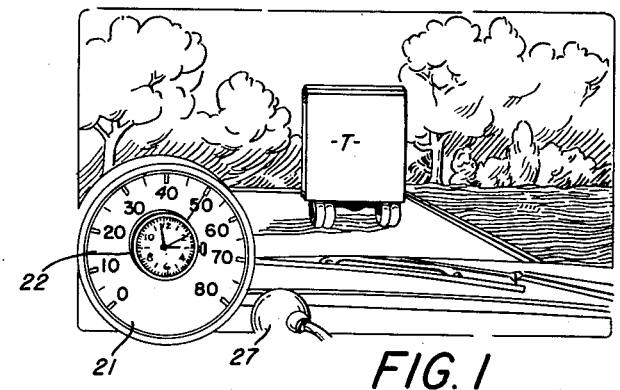
FIGURE 1 is a reproduction of a photograph taken by the vehicle speed recording apparatus.

The field of view of the camera 19 permits the exposure of a negative therein as will be understood by those skilled in the art so that a photographic print such as shown in FIGURE 1 of the drawings may be made therefrom. By referring thereto it will be seen that the camera field of view extends through the larger portion of the windshield 10 of the equipped vehicle and includes in the lower lefthand portion of the photograph the representation of the speedometer 21 and the clock 22. The photograph shows a truck T in the roadway in front of the equipped vehicle and the focus of the camera 19 was such that the truck T is clearly and distinctly visible in the representation of the photograph print comprising FIGURE 1.

It will thus been seen that the name of the trucking company and/or the license plate or plates on the truck are readily discerned in the photograph together with the indication of the speedometer 21 which shows a speed of 50 m.p.h. and the clock which shows approximately 3 o'clock.

In order that adequate illumination can be provided for the speedometer 21 and the clock 22 which will compare with the light level of the remainder of the field of view of the camera 19, light fixtures 27 are secured to the carrier frame 16 at either side thereof and directed toward the speedometer 21. The power cord 28 for the light fixtures 27 is simply plugged into the cigarette lighter outlet on the instrument panel 15 of the vehicle. The forward end of the carrier frame 16, that directly supports the speedometer 21, is provided with a pair of vacuum cups 29 which are secured to the upper horizontal portion of the instrument panel 15. The third platform 24 which supports the lens mount 25 and lens 26 has one end of a flexible strap 30 secured thereto. The strap 30 extends downwardly beneath the front seat 12 and upwardly paralleling the back 13 of the front seat 12 and is secured to the end 17 of the carrier frame 16 by means of a buckle.

The vehicle speed recording apparatus will thus be seen to be relatively compact and of light weight and positioned in the vehicle simply and easily by resting the forward end thereof on the instrument panel and the nearmost portion thereof on the back of the front seat.

Each of the three platforms 18, 20 and 24 are adjustably mounted on the carrier frame 16, the first platform 18 being actually carried on the end portion 17 of the carrier frame 16, so that the lens 26 and the speedometer 21 may be easily and quickly positioned in proper location. The camera 19 is focused at a point in front of the equipped vehicle and it encompasses the lens 26 which changes the focus with respect to the speedometer 21 and therefor brings the same into sharp focus in the picture.

It will thus be seen that a vehicle speed recording device has been disclosed which has a number of advantages as compared with the devices heretofore known. Important among these advantages is the cost of the apparatus which is inexpensive as compared with the cost of the equipment heretofore used. The present invention can be used to record violations in front of, at the side of, or behind the patrol car and the camera can be readily dismounted and used on the outside of the patrol car to complete a pictorial record when desired.

The single frame sequence camera is readily adaptable to daytime light changes and the clarity and quality of the prints produced from negatives in the camera of the apparatus is due to many combinations of lens openings and shutter speed available. Of equal importance is the fact that a relatively small roll of film is used in the 35 mm. single frame sequence camera and the prints therefrom of any violation or other record may be obtained at an early date as there is no need to await the completion of exposure of a complete reel of movie film as has been heretofore necessary.

It will occur to those skilled in the art that the construction herein disclosed may be modified in minor respects within the scope of the claims as, for example, the lens 26 and speedometer 21 may be enclosed in a suitable housing structure if desired or found feasible.

It will thus be seen that the vehicle speed recording apparatus disclosed herein meets the several objects of my invention and having thus disclosed my invention what I claim is:

1. Apparatus for identifying and recording the speed of a trailed vehicle, said apparatus comprising, in a unitary structure, a substantially flat instrument support body having a forward end and a rear end and of a size capable of being mounted substantially horizontally within a carrier vehicle equipped with conventional speedometer driving means, means for securing said support body in a substantially horizontal operative position on the carrier vehicle, a speedometer unit mounted on and adjacent to the forward end of said support body and facing toward the rear end of the latter, said speedometer unit having a drive means adapted for connection with the carrier vehicle speedometer driving means, a camera unit mounted on the support body adjacent to the other end of the latter and having a lens generally directed toward the front end of the support body and focused to encompass a field of view remote from the carrier vehicle, a converging lens unit mounted on the support body at a location between the speedometer unit and the camera unit, and said lens unit being positioned to focus an image of the face of the speedometer unit on a portion of the camera recording medium.

2. The invention according to claim 1 wherein the mounting for each of the said units on the support body is adjustable in the direction of the front and rear ends of the support body whereby the units may be adjustably spaced relative to one another.

3. The invention according to claim 1 wherein the said instrument support body comprises a forward end section and a rearward end section slidably coupled together whereby the length of the body between the forward and rear ends may be adjusted.

4. The invention according to claim 1 wherein the said instrument support body is of substantial length whereby the rear end may be supported on top of the back of a vehicle front seat and the forward end may be supported on a portion of the carrier vehicle forwardly of the front seat, means for securing the said forward end of the support body to an underlying supporting part of the carrier vehicle and means for securing the rear end of the support body on top of the back of the front seat of a carrier vehicle comprising a strap secured at one end to the rear end of the support body and having its other end secured to the support body intermediate the ends of the latter and said strap having a substantial length whereby it may extend under and around a supporting seat from front to back to secure the support body thereon.

5. The invention according to claim 1 with a pair of electric light fixtures mounted on opposite sides of the carrier body between the speedometer unit and the lens unit and focused on the face of the speedometer unit and electric current conductors connected with said light fixtures and adapted for connection with a source of electric potential.

References Cited in the file of this patent

UNITED STATES PATENTS

| | | |
|---|---|---|
| 661,688 | Castelow | Nov. 13, 1900 |
| 1,034,751 | Zyliewicz | Aug. 6, 1912 |
| 1,228,722 | Verbeck | June 5, 1917 |
| 1,700,496 | Heitzler | Jan. 29, 1929 |
| 2,148,119 | Grist | Feb. 21, 1939 |
| 2,250,442 | Abell | July 29, 1941 |
| 2,336,081 | Finnegan et al. | Dec. 7, 1943 |
| 2,392,890 | Vincent et al. | Jan. 15, 1946 |
| 2,866,395 | Manning | Dec. 30, 1958 |